April 11, 1950 W. G. VAN VOORHIS 2,503,891
FORWARD AND REVERSE TRANSMISSION CONTROL SYSTEM
Filed Jan. 7, 1947 5 Sheets-Sheet 1

INVENTOR.
*William G. Van Voorhis.*
BY
*Corbett, Mahoney & Miller*
ATTORNEYS

INVENTOR.
William G. Van Voorhis
BY
Corbett, Mackay & Miller
ATTORNEYS

April 11, 1950 W. G. VAN VOORHIS 2,503,891
FORWARD AND REVERSE TRANSMISSION CONTROL SYSTEM
Filed Jan. 7, 1947 5 Sheets-Sheet 5

INVENTOR.
William G. Van Voorhis
BY
Abbott, Mahoney & Miller
ATTORNEYS

Patented Apr. 11, 1950

2,503,891

UNITED STATES PATENT OFFICE 2,503,891

FORWARD AND REVERSE TRANSMISSION CONTROL SYSTEM

William G. Van Voorhis, Columbus, Ohio, assignor to The Jaeger Machine Company, Columbus, Ohio, a corporation of Ohio Application January 7, 1947, Serial No. 720,665

17 Claims. (Cl. 192—4)

My invention relates to a forward and reverse transmission control system. It has to do, more particularly, with a clutch system interposed between a driving input shaft and an output shaft adapted to be selectively driven in either direction. In the following description, by way of example, I indicate that this system is particularly applicable to driving mechanisms for controlling the swinging of the booms of cranes or the like but it is to be understood that my invention is not necessarily limited thereto.

One of the most troublesome units in cranes or similar machines is the unit or units which control swinging of the boom laterally. These units usually include internal expanding clutches and external contracting brakes operating on the same cups or drums and, consequently, developing considerable heat which not only interferes with proper operation of the mechanism but also causes considerable damage to the same. With most prior art units, considerable time is lost in obtaining the desired movements of the boom due to excessive slipping of the clutches and brakes. Also, the work of stopping and starting the swinging of the boom is not evenly distributed on the various clutches and brakes. Prior art boom swing control units have also usually included complicated means for automatically stopping the swinging motion of the boom at predetermined right and left points or omit such automatic devices altogether. In addition to the friction clutches and brakes, these units also have included positive swing lock mechanism to hold the boom positively in various positions to which it is swung and this type of mechanism is difficult to operate, costly to maintain and wears or becomes inoperative quickly. In addition, such positive locks will not yield even slightly when tangential overloads tending to swing the boom are encountered, and, consequently, the lock mechanism is often damaged by such overloads. In an attempt to prevent engagement and disengagement overlap between various clutches and brakes of such prior art units, the time interval between engagement and disengagement of the various clutches and brakes has been increased thereby decreasing the speed of operation and accurate control of the machine. These prior art units are not entirely satisfactory in other respects.

One of the objects of my invention is to provide a simple but powerful and rugged clutch system interposed between a driving input shaft and an output shaft to be driven, which may be actuated with ease to selectively connect or disconnect the input shaft and the output shaft so as to drive the latter shaft in either direction, to stop the shaft quickly when desired and to hold it in such position as long as desired.

Another object of my invention is to provide a clutch system of the type indicated above which will function in the manner indicated to selectively drive the output shaft in either direction regardless of the direction of rotation of the input shaft which may be driven by the reversible gears of the main transmission of a machine to which my system is applied.

Still another object of my invention is to provide a clutch system which is especially suitable for use on a crane or similar machine between the main transmission and the boom swing base or segment to effectively control the swinging of the boom and the accurate positioning of the boom laterally of the machine.

An additional object of my invention is to provide a clutch system of the type indicated above which includes simple and powerful, though controllably yielding, means for holding the swinging base or segment in any desired position which is an especially valuable feature when crane, loader, drag line, back hoe, or pile driving attachments are used on the machine to which my system is applied.

A further object of my invention is to provide a clutch system for controlling the swing of a crane boom or the like which includes means for automatically stopping the swinging motion at predetermined right and left points, for example, 90 degrees each way from center, such automatic stop being effective whether the main transmission, associated with my system and driving the input shaft thereof, is in forward or reverse speed or whether the swinging motion is produced by gravity or inertia.

Another object of my invention is to provide a boom swing clutch system of such a nature that the need for positive means to lock the boom in desired position is eliminated, but which provides a friction lock or brake which is normally engaged but which will automatically release itself whenever a suitable control is actuated to connect power to the swinging mechanism of the boom and which will automatically engage itself whenever the control is actuated to disconnect power from the swinging mechanism of the boom.

Another object of my invention is to provide a friction lock or brake of the type indicated above which is sufficiently powerful to hold any type of boom or similar attachment in position under normal conditions and yet can yield slightly when tangential overloads are encountered which tend to swing the boom away from its desired position.

Another object of my invention is to provide a clutch system of the type indicated above which is provided with control means for preventing engagement and disengagement overlap between various clutches and brakes and yet reducing the interval between such engagement and disengagement to a minimum, such intervals between operation of the various clutches and brakes being adjustable.

Another object of my invention is to provide a clutch system of the type indicated above wherein safety control means is provided for insuring that the various clutches and brakes are engaged and disengaged in the proper sequence at all times.

Another object of my invention is to provide a clutch system of the type indicated wherein the clutches and brakes are of such a nature that accelerating and decelerating slippage are reduced to a minimum in each clutch and the stopping and starting work is divided more uniformly among the various clutch and brake members.

Another object of my invention is to provide a system of the type indicated wherein internal expanding clutches only are used for the clutching and braking operations without the customary external contracting bands with the result that the heat developed in each clutch can be dissipated more readily by exterior cooling fins.

Another object of my invention is to provide a system of the type indicated employing simple and powerful clutches which are self-energizing in either direction but which are composed of a minimum number of parts.

A further object of my invention is to provide a system of the type indicated employing a plurality of clutches of the internal expanding type, the parts of each clutch being interchangeable with corresponding parts of the other clutches.

Various other objects will be apparent.

In accordance with my invention, I provide my clutch system between an input shaft and an output shaft. The input shaft may, for example, be a shaft driven in either direction by the main reversible transmission of a crane or the like and the output shaft may be the shaft on a crane which actuates the boom swing segment or base. My system can be controlled to drive the output shaft in either direction or to brake it to a stop at any desired instant and hold it in fixed position. Furthermore, my system will work properly regardless of the direction of rotation of the input shaft.

According to one illustrative embodiment of my clutch system I employ three clutches of the self-energizing internal expansion type. One of these clutches which I will term the master drive clutch, is associated with the input shaft and is normally disengaged. However, when engaged it drives, by a suitable driving connection, a reversible drive and brake shaft in a direction depending upon the direction of rotation of the input shaft. This shaft carries the other two clutches of my system which I will term the reversing and brake clutches and which are axially spaced thereon. These two clutches are both normally engaged and serve to exert a braking effect on the output shaft, the axis of the output shaft being disposed at right angles to the axis of the drive and brake shaft. This braking effect is accomplished by the use of a large gear which is non-rotatably carried by the output shaft close to the drive and brake shaft, and which meshes at diametrically opposed points, on opposite sides of the axis of the output shaft, with smaller gears carried on the drive and brake shaft at axially spaced points adjacent the periphery of the large gear. Each of the smaller gears is associated with one of the clutches carried on the drive and brake shaft but is rotatably mounted on such shaft. When either of such clutches is engaged the associated gear will be connected to such shaft and when either of such clutches is disengaged the associated gear will be disconnected from such shaft. However, since both of such clutches are normally engaged, the two gears are connected to the drive and brake shaft, and since these gears engage the large gear on the output shaft at diametrically opposed points, they act to oppose each other and to thereby exert an effective, dual action on the output shaft. When one of such brake clutches is disengaged and the drive clutch is engaged, the input shaft serves to drive the drive and brake shaft and, therefore, the output shaft in one direction. When the other of such brake clutches is disengaged and the drive clutch is engaged, the input shaft serves to drive the drive and brake shaft and, therefore, the output shaft in the opposite direction. Since at least one of the reversing clutches is always engaged, as soon as the second brake clutch is again engaged, after the drive clutch has first been disengaged, the brake clutches will exert a braking action on the output shaft. Thus, disengagement of the one brake clutch will serve to swing the boom in one direction and disengagement of the other brake clutch will serve to swing the boom in the opposite direction. When both brake clutches are engaged, the boom will be held in a fixed position.

I provide a combination spring-actuated and hydraulic-actuated control system for engaging and disengaging the three clutches. This control system is so arranged that the drive clutch cannot be engaged until either one or the other brake clutch is disengaged. The clutches are so designed that when the main control lever of the control system is in neutral, the drive clutch will automatically disengage and the brake clutches will automatically engage. The control lever can be set to swing the boom in either direction and this will be accomplished by disengagement of one of the brake clutches and subsequent engagement of the drive clutch. When swinging of the boom is to be stopped, the control lever is returned to neutral and the drive clutch will automatically disengage and then such brake clutch will automatically engage, preventing further swinging of the boom.

To guard against swinging of the boom too far in either direction, for example, when the operator neglects to shift the control properly in sufficient time to stop swinging in such direction, I provide simple means for automatically stopping movement of the boom at predetermined right and left points, for example, ninety degrees in each direction away from center. This means comprises trigger and valve mechanism which is associated with the hydraulic control system and actuates it to cause disengagement of the drive clutch and engagement of the brake clutch which has been previously disengaged to permit the swinging movement of the boom in the desired direction. Thus, swinging movement of the boom will be stopped.

The preferred embodiment of my invention is illustrated in the accompanying drawings wherein similar characters of reference designate corresponding parts and wherein.

Before explaining in detail the present invention, it is to be understood that the invention is not limited in its application to the details of construction and arrangement of parts illustrated in the accompanying drawings since the invention is capable of other embodiments and of being practiced or carried out in various ways. It is to be understood also that the phraseology or terminology employed herein is for the purpose of description and not of limitation.

Figure 1:
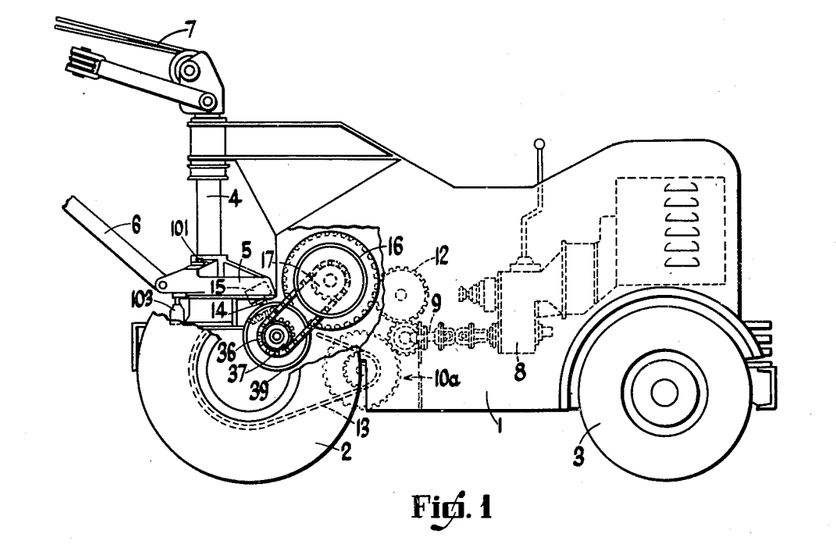
Figure 1 is a side elevational view, partly broken away, of a yard crane in which my clutch system is incorporated.
Figure 2:
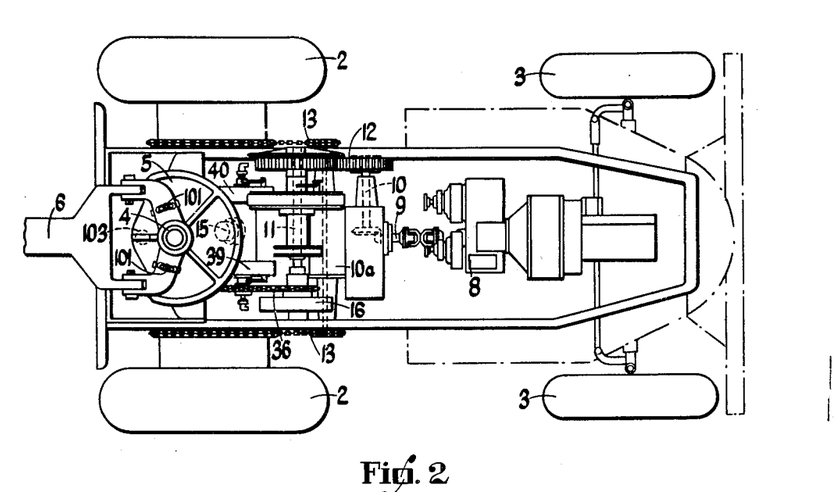
Figure 2 is a plan view of the crane.

With reference to the drawings, I have shown in Figures 1 and 2, for illustrative purposes, a yard crane to which my invention is applied. This crane consists of the usual body or chassis 1 which is carried on the front wheels 2 and the rear wheels 3. Supported on the front of the machine is a vertically disposed mast 4 which carries a boom swinging segment 5 on its lower end. Pivoted to the segment 5 for vertical movement is the forwardly extending boom 6 which is controlled in its vertical movement by cables 7 extending from the forward end of the mast 4 in the usual manner. When the segment 5 is rotated, it swings the boom 6 laterally in the usual way. The machine also includes the usual reversible transmission 8 which is provided with a forwardly extending driving shaft 9 that drives a transversely extending shaft 10. The shaft 10 drives a second transversely extending shaft 11 through the medium of a set of gears 12. Suitable drive means 10a drives the forward wheels 2 through chain and sprocket connections 13. The clutch system of my invention is interposed between the drive shaft 11 and the shaft 14 which carries the pinion 15 that meshes with the boom swing segment 5. In the following description, I shall refer to the shaft 11 as the input shaft and the shaft 14 as the output shaft. It will be apparent that selectively driving the shaft 14 in either direction will produce rotation of the boom swing segment 5 in the proper direction and thereby result in swinging of the boom 6 in the proper direction.

Figure 3:
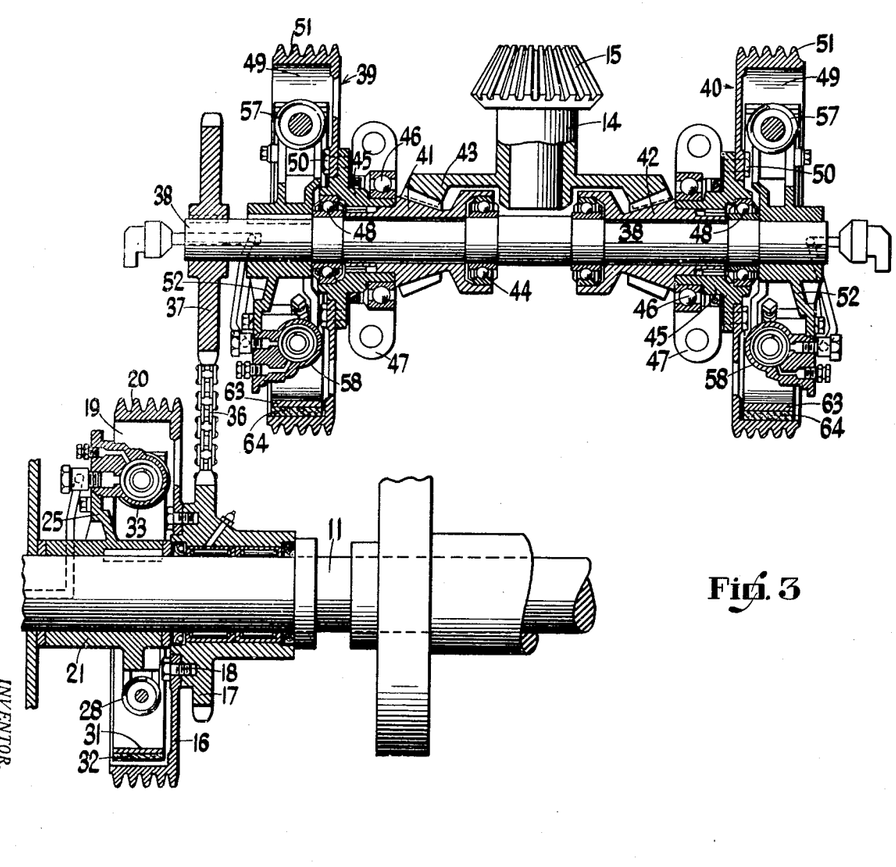
Figure 3 is an enlarged view, mainly in section, illustrating my clutch mechanism.
Figure 4:
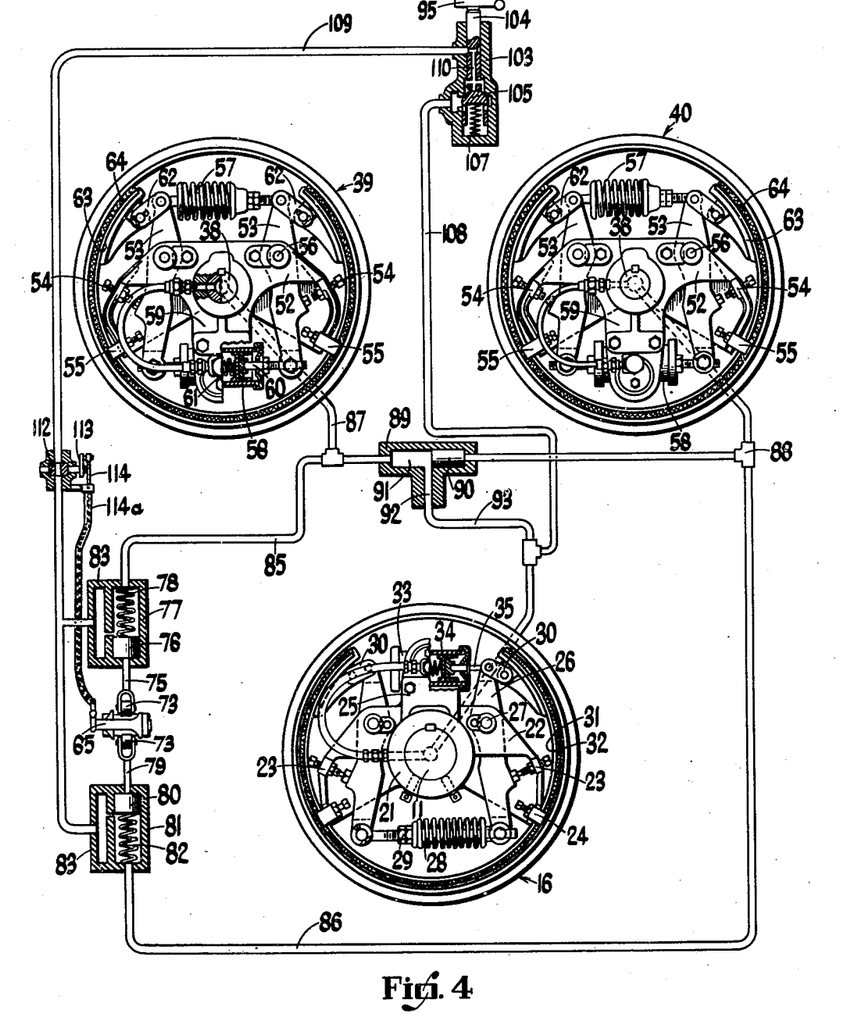
Figure 4 is a schematic illustration of the system.

The clutch system of my invention is illustrated best in Figures 3 and 4. In this system, I employ, for example, 3 clutches of the internal expanding self-energizing type. However, although I prefer to use this type of clutch, other types may be employed. One of these clutches, which I shall designate the master drive clutch 16, is associated with the input shaft 11. This clutch 16 is disposed at one end of the shaft 11 and includes a sprocket member 17 which is rotatably carried on the shaft 11. Bolted to the member 17 by means of bolts 18 is the clutch cup or drum 19 which carries cooling fins 20 on its periphery. The members 17 and 19 are the driven members of the clutch. The driving unit of the clutch includes a sleeve member 21 which is keyed to the shaft 11 and is disposed within the cup 19. This member 21 carries the outwardly extending supporting arms 22 on opposite sides thereof. Each of the arms 22 carries an inwardly extending adjustable stop member 23 and an outwardly extending shoe-retaining member 24 which serves to prevent movement of the shoe off the drum when the clutch is engaged. The sleeve 21 also carries a radially extending cylinder supporting portion 25. Pivoted intermediate their ends to the supporting arms 22 are the actuating levers 26. Each of these levers is pivoted for movement about a pivot pin 27. It will be noted that one of the arms of each of the levers is longer than the opposite arm thereof. The longer arms are connected to a compression spring unit 28 disposed between such arms and normally tending to swing them apart. The force exerted by this spring unit is adjustable through the medium of the nuts 29. The shorter arms of the levers 26 are pivotally connected by means of links 30 to the opposite ends of an almost circular but split metal clutch shoe 31 disposed within the cup 19 and carrying a clutch lining 32 which is adapted to be brought into contact with the cup 19. Disposed between the shorter arms of the levers 26 is a hydraulic cylinder 33 which is carried by the support 25. This cylinder 33 has dual pistons 34 disposed therein which are provided with oppositely extending piston rods 35 that are pivotally connected to the ends of levers 26. Hydraulic fluid will enter at the center of the cylinder between the two pistons 34.

Normally, the spring unit 28 serves to spread the longer ends of the levers 26 apart until they engage the stops 23, serving to contract the shoe 31 and thereby disengage the lining 32 from the cup 19. Upon the application of sufficient hydraulic pressure to the cylinder 33, the resistance of the spring unit 28 will be overcome and the shorter ends of the levers 26 will be swung apart and thereby cause the shoe 31 to be expanded and the lining 32 to engage the cup 19. The shaft 11 will be normally continuously rotating but since the clutch 16 is normally disengaged, the sprocket 17 will be stationary. However, as soon as the clutch is engaged, the sprocket 17 will be driven by the shaft 11.

The sprocket 17 is connected by a chain 36 to a sprocket 37 which is keyed on the end of a transversely extending reversible drive and brake shaft 38 which is disposed parallel to shaft 11. This shaft carries the other two clutches 39 and 40 of my system and I shall term these clutches reversing and brake clutches. Associated with the clutch 39 is a small gear or bevel pinion 41 and assocaited with the clutch 40 is a small gear or bevel pinion 42, both of these pinions being rotatably carried by the shaft 38. These pinions mesh at diametrically opposed points with a bevel gear 43 which is non-rotatably mounted on the output shaft 14 that is disposed at right angles to the shaft 38. It will be apparent that rotation of the bevel pinion 41 will drive the output shaft 14 in one direction while rotation of the bevel pinion 42 will drive the output shaft 14 in the opposite direction. Since the pinion 15 is formed as a part of the shaft 14 and meshes with the boom swing segment 5, this will produce proper swinging of the boom. Each of the pinions 41 and 42 has associated with its inner side a ballbearing unit 44 which surrounds the shaft 38. The opposite side of the pinion is disposed within and keyed to a sleeve 45 which forms a part of the driven unit of the clutch. The sleeve 45 is rotatably carried within a ballbearing 46 which is carried on a suitable bearing standard 47. The sleeve 45 also has disposed therewithin a ballbearing 48 which surrounds the shaft 38. Thus, the sleeve 45 and pinion 41 will rotate as a unit on the shaft 38 and the bearings 44, 46 and 48 will prevent undue strain on the shaft, as a result of the intermeshing of the pinions with the gear 43.

The brake clutches 39 and 40 are of identical structure and, therefore, a description of one will suffice. Each of the clutches includes a drum or cup 49 which is bolted to the sleeve 45 by means of bolts 50. Cooling fins 51 are provided on the periphery of the cup 49. The driving unit of the clutch is very much like that of the clutch 16 previously described. In this case also, the sleeve 45 carries outwardly extending supporting arms 52 and each of these arms carries a pivoted actuating lever 53. Each of the arms 52 also carries an inwardly extending adjustable stop 54 and a shoe-retaining member 55. Each of the levers 53 is pivoted about a pin 56 so that one end of the lever is longer than the other end. However, in this clutch the spring unit 57 is associated with the shorter arms of the levers and the hydraulic cylinder 58 is associated with the longer ends of the levers, rather than as in the clutch 16 where the reverse arrangement is provided. The cylinder 58 is carried by a radially extending support 59 formed as a part of the sleeve 45. The longer ends of the levers 53 are connected pivotally to the ends of the piston rods 60 which project oppositely from dual pistons 61 provided in the cylinder 58. The compression spring unit 57 has its ends connected by means of links 62 to the ends of the shoe 63 which carries the lining 64.

The clutches 39 and 40 are also self-engaging. In each clutch, the spring unit 57 expands the shoe 63 and forces the lining 64 outwardly into contact with the cup 49. As soon as sufficient hydraulic pressure is applied to the cylinder 58, the longer ends of the levers 52 will be swung outwardly and the spring of unit 57 will be compressed, the shorter arms of levers 52 swinging towards each other and contracting the shoe 63 to disengage the lining 64 from the clutch cup 49. It will be apparent that since in clutch 16 the spring unit 28 is associated with the longer lever arms and the cylinder 33 is associated with the shorter lever arms, a greater hydraulic pressure will be required to engage this clutch than to disengage either of the clutches 39 or 40 wherein the cylinder 58 is associated with the longer lever arms while the spring unit 57 is associated with the shorter lever arms. Also, if the pressure exerted by spring units 57 and 28 is equal, when the hydraulic actuating pressure on the two clutches is released, the spring unit 28 will act to disengage clutch 16 more quickly than the spring unit 57 will act to engage clutch 39 or 40, due to the more favorable leverage arrangement associated with spring 28. The interval between release of clutch 39 or 40 and engagement of clutch 16 and vice versa, may be adjusted by adjusting spring units 57 relative to unit 28 and by adjusting stops 54 and 23. Instead of accomplishing the successive operation of the clutches by providing the different length lever arms, the same result can be obtained with arms of equal length but associated with spring units of different strengths. For example, spring unit 28 may be stronger than spring unit 57. As will be more clearly apparent hereinafter, an important result is accomplished with this arrangement.

Normally, the input shaft 11 is rotating continuously but since clutch 16 is disengaged normally, the sprocket 17 is not driven and the shaft 38, consequently, remains stationary. The two clutches 39 and 40 are normally in engagement and thereby the pinions 41 and 42 are non-rotatably connected to the drive and brake shaft 38. Since these pinions 41 and 42 mesh with the gear 43 at diametrically opposed points, they act on the gear 43 in such a manner that they oppose each other and prevent rotation of this gear. Thus, when clutches 39 and 40 are engaged, which is their normal condition, they exert an effective braking action on the output shaft 14. Thus, normally the boom swing segment 5 and, consequently, the boom is held stationary. However, in case of excessive force being applied to the boom and tending to swing it, the friction clutches could slip slightly to prevent damage to the machine. As long as the clutches are in the conditions described, the boom will remain stationary. In order to swing it in either direction, it is first necessary to engage the drive clutch 16 and to disengage one of the brake clutches 39 or 40. When this is done, the input shaft 11 will drive the pinion 17 which, in turn, will drive the shaft 38. This shaft, through the medium of the brake clutch 39 or 40 which is still engaged, will drive the output shaft 14. Since the other brake clutch is disengaged, the driving unit thereof, including the shoe 63 and lining 64, will rotate with the shaft 38 without driving the pinion 41 or 42 associated therewith. It will be apparent that it is extremely important in starting the swinging movement of the boom to always disengage one of the clutches 39 or 40 before engaging the clutch 16, in order to prevent injury to the mechanism. Furthermore, it is important, in stopping swinging movement of the boom to disengage the clutch 16 before engaging the brake clutch 39 or 40 which has previously been disengaged to permit swinging of the boom. The proper sequence in the operation of these clutches is accomplished with a hydraulic control system which I will now describe in detail.

Figure 5:
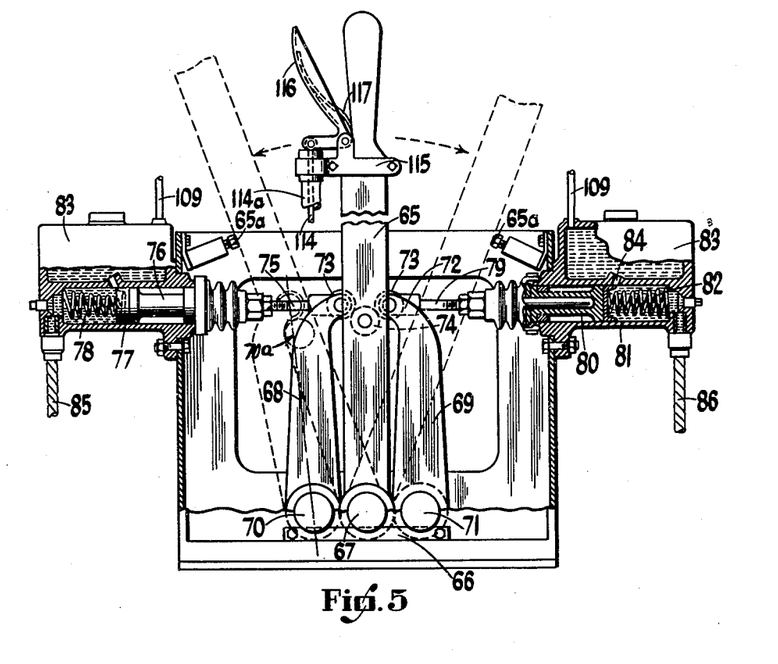
Figure 5 is a detail in side elevation, partly broken away, of the main control lever and associated units of the system.
Figure 6:
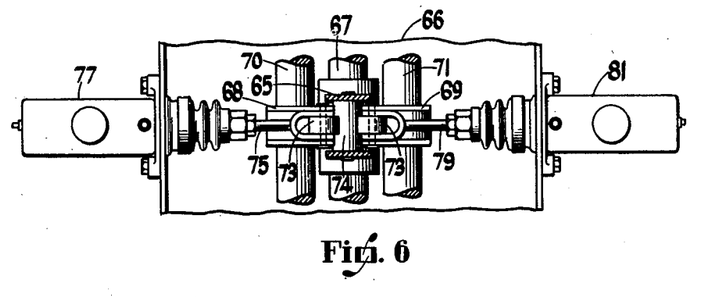
Figure 6 is a plan view of the main part of the structure of Figure 5.

This control system is illustrated best in Figures 4, 5 and 6. It includes a main control lever 65 (Figures 5 and 6) which is pivoted at its lower end to a suitable support 66 by a pivot pin 67. Stops 65a are associated with lever 65 to limit swinging thereof on opposite sides of the control lever 65, upstanding levers 68 and 69 have their lower ends pivoted to the support 66 by means of the pins 70 and 71. The levers 68 and 69 are disposed closely adjacent the lever 65 and each is provided with an hook-shape upper end 72 which extends between the split lever 65 and carries a roller 73. The rollers 73 normally engage a roller 74 carried between the portions of the lever 65. The upper end of the lever 68 is pivoted to the end of a piston rod 75 which extends from a piston 76 disposed in a master cylinder 77. A compression spring 78 disposed in cylinder 77 normally forces the rod 75 outwardly. Similarly, the upper end of the lever 69 is pivotally connected to a piston rod 79 which extends outwardly from a piston 80, disposed within a master cylinder 81 that encloses a compression spring 82 which normally forces the rod 79 outwardly. Thus, the springs 78 and 82 force the piston rod 75 and 79 towards each other and the rollers 73 engaging the rollers 74 tend to hold the control lever 65 in neutral position. The lever 65 may be swung in either direction to selectively actuate the cylinders 77 and 81. For example, when the lever 65 is swung to the left, as shown by the dotted lines in Figure 5, the rod 75 will be pushed into the cylinder 77 and exert pressure on the fluid therein wh'ch is beyond the piston 76. At the same time the lever 68 will be swung to the left and when the roller 74 of lever 65 moves beyond the effective center l'ne 70a thereof of lever 68, as shown by dotted lines in Figure 5, the spring 78 causes the hook-shape end 72 thereof to hook around roller 74. Thus, roller 73 will be above roller 74 and will engage it in such a manner as to hold lever 65 in the position to which it has been moved. When the lever 65 is swung to the right, the mechanism will function in the same manner and the cylinder 81 will be actuated, the spring 82 serving to hold the lever 65 in position when over center.

It will be noted from Figure 5 that each of the master cylinders includes the liquid reservoir 83 which is connected to the actuating parts of the cylinder by an inlet 84. However, as soon as the piston of the cylinder starts to move, this piston will cover the inlet 84 to prevent backing up of pressure into the reservoir.

As shown in Figures 4 and 5, a line 85 leads from the main part of the master cylinder 77. Similarly, a line 86 leads from the master cylinder 81. The line 85 is connected by a branch line 87 to the hydraulic actuating cylinder 58 of the brake clutch 39. The line 86 is connected to the hydraulic cylinder 58 of the brake clutch 40. The line 85 is also connected to the line 86 by a fitting 88. Interposed in the line 85 is a cut-over valve 89. This valve is T-shaped and has a movable piston 90 disposed therein in the chamber 91 which is in axial alignment with the line 85. An outlet 92 leads from the side of the valve 89 and is connected by a line 93 which, in turn, is connected to the hydraulic cylinder 33 of the driving clutch 16. When pressure is applied to one end of valve 89, the piston 90 thereof will move to the opposite end of the valve and will prevent fluid from flowing directly through the valve 89 but will permit it to branch into the line 93.

With this hydraulic control arrangement, by swinging the control lever 65 in either direction, one of the clutches 39 or 40 will first be selected and disengaged and then the driving clutch 16 will be engaged. For example, if the lever 65 is swung in the proper direction to actuate master cylinder 77, forcing piston 76 inwardly against resistance of spring 78, fluid will be forced through the line 85 (Figure 4), through branch line 87 into cylinder 58 and will disengage the clutch 39 against stops 54. The fluid forced into valve 89 will move the piston 90 into the opposite end of the valve and will permit pressure to be applied through line 93 into the cylinder 33 which will engage the driving clutch 16. As previously indicated, more pressure will be required to engage the clutch 16 than to disengage the clutch 39, due to the more favorable leverage associated with the hydraulic cylinder of clutch 39, and this will insure that the brake clutch will always be disengaged before the driving clutch is engaged. When the control lever 65 is returned to neutral position, the piston 76 of master cylinder 77 will be returned to its original position, permitting hydraulic fluid to enter thereinto from the line 85. This will relieve the hydraulic pressure on the cylinder 58 of clutch 39 and on the cylinder 33 of clutch 16. The clutch 16 will automatically disengage itself and the clutch 39 will automatically engage itself when this happens. However, due to the more favorable leverage associated with spring unit 28 of driving clutch 16, this clutch will be disengaged before the brake clutch 39 is engaged. On the other hand, when the control lever 65 is moved in the opposite direction beyond neutral to actuate the master cylinder 81, forcing the piston 80 inwardly against the resistance of spring 82, fluid will be forced through the line 86 into the cylinder 58 of clutch 40 and simultaneously through line 85 into and through the valve 89 into line 93, it being understood that the piston 90 of valve 89 will move to the opposite end of the chamber 91 to permit this. Fluid pressure from the line 93 will be applied to the cylinder 33 of driving clutch 16 to engage the clutch. However, it will be understood that the clutch 40 will be disengaged before the clutch 16 is engaged because of the more favorable leverage associated with cylinder 58 of clutch 40. As soon as the control lever 65 is again returned to neutral position so as to permit the fluid to flow back from line 86 into cylinder 81, the clutch 16 will first be disengaged and then the clutch 40 will be engaged. The more favorable leverage associated with the spring unit 28 of clutch 16 will insure that this clutch will be disengaged before the clutch 40 is engaged.

In case the operator of the crane sets the control lever 65 to swing the boom in one direction and forgets to shift the lever, or if he purposely permits the boom to swing to its full l'mit of travel, means is provided for stopping such swinging movement at a predetermined point. This means operates to stop the boom, of desired, at predetermined points in both directions, for example, ninety degrees in each direction away from center. This means includes a trigger and valve mechanism which is illustrated best in Figures 4, 7 and 8.

Figure 7:
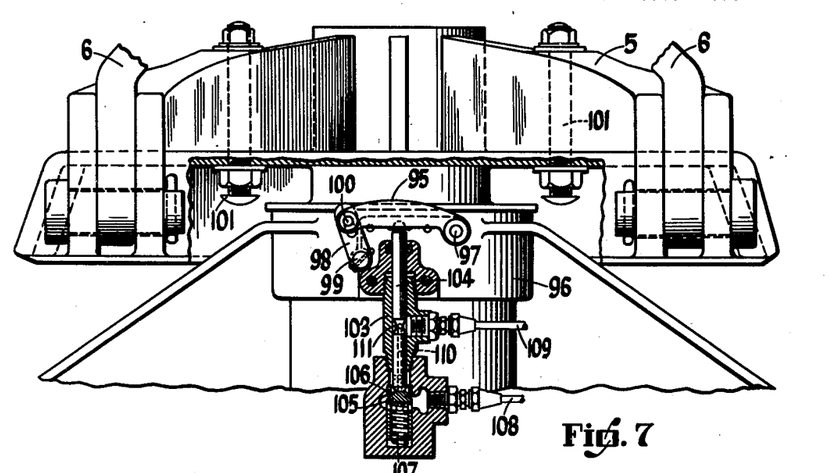
Figure 7 is an end elevational view, partly broken away, of the mast turning segment of the crane illustrating the automatic boom stop associated therewith.
Figure 8:
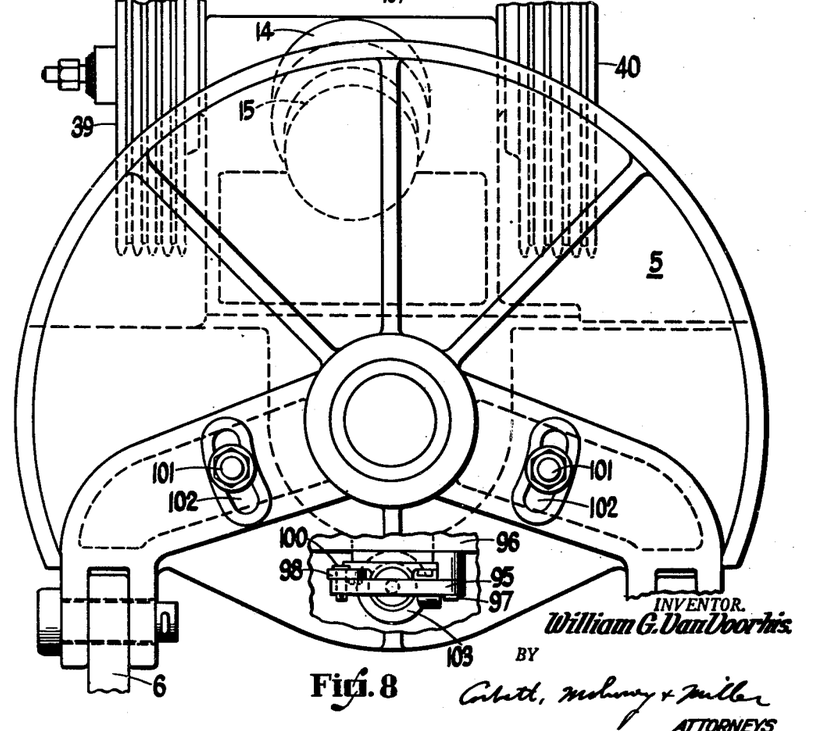
Figure 8 is a plan view of the structure of Figure 7.

The trigger mechanism comprises a trigger arm 95 which is pivoted to the stationary mast supporting base 96 for vertical movement about a pivot 97. A link 98 is associated with the opposite end of trigger member 95 and is pivoted by a pin 99 to member 96. The upper end of link 98 is connected by a pin and slot connection 100 to the end of the member 95. The boom swing segment 5 is provided with a pair of trigger actuating pins 101, each of which is adjustably disposed in an arcute slot 102 which is concentric with the axis of segment 5. The pins 101 are positioned to the right and left of the center line of the forwardly extending boom at such an angle relative thereto that the pins will engage the trigger 95 at the proper instant, upon swinging of the boom too far in either direction, to stop the boom when it reaches a predetermined position, for example, ninety degrees away from center. It will be noted that the two ends of member 95 are curved downwardly so that the pins will engage this member and gradually force it downwardly.

The member 95 actuates a knock-out valve 103. This valve includes a stem 104, the upper end of which is engaged by member 95. The stem engages a valve member 105 which normally is seated on a seat 106 by spring 107. A fluid inlet line 108 (Figure 7) leads into the valve 103 at the lower end thereof. A fluid outlet line 109 leads from the side of the valve 103. A passageway 110 extends through the valve stem from just above the member 105 to an annular space 111 which always communicates with the line 109. Normally, the valve 103 is closed by spring 107. However, as soon as trigger member 95 forces the stem 104 downwardly, the lines 108 and 109 are connected together. The line 108, as shown in Figure 4, is connected to the line 93. The line 109 is connected to the top sides of the reservoirs 83 of both master cylinders 77 and 81.

Interposed in the line 109 is a valve 112. This valve is closed and opened by an arm 113. This arm is actuated by means of a wire 114 extending through a conduit 114a. The conduit is anchored to valve 112 and to bracket 115 at the upper end of lever 65 (Figure 5). A handgrip 116 is pivoted to bracket 115 and when pressed towards the lever will exert a pull on the wire 114. This will close the valve 112. However, normally a spring 117 associated with member 116 swings it outwardly and serves to keep the valve 112 open.

Assuming that the control lever 65 has been actuated to disengage one of the brake clutches 39 or 40 and to engage the drive clutch 16, in the manner previously described, the boom will swing in the proper direction until one of the pins 101 engages the trigger member 95, provided the operator does not move the control lever back to neutral position. As soon the member 95 opens the valve 103, pressure on the cylinder 33 of clutch 16 will be relieved, allowing the clutch to automatically disengage itself. The fluid displaced thereby from cylinder 33 through the line 108 will flow into line 109, past valve 112, into the reservoirs 83 of the master cylinders 77 and 81. Also, the brake clutch which has been disengaged previously to swing the boom, for example, clutch 39, will automatically engage itself, the fluid from cylinder 58 being displaced through line 87, line 93 and lines 108 and 109 to the master cylinders 77 and 81. As previously indicated, the clutch 16 will disengage itself before the clutch 39 engages itself.

In order to operate the clutches to return the boom to the center or other desired position, the operator must first close the valve 112 to permit the pressure to again build up in the hydraulic system. With the valve 112 closed, if the control lever 65 is shifted to the proper position to obtain the desired movement of the boom, for example, if the control lever is moved to actuate master cylinder 77, pressure in lines 85, 93, and 108 will be built up. This will first actuate clutch 39 to disengage it and then clutch 16 to engage it. This will produce swinging movement of the boom and thereby move trigger 95 away from valve stem 104, permitting valve 103 to close. The operator may now permit the valve 112 to open and the fluid system will function in the normal manner. During normal operation of the control system, pressure cannot back up into the reservoir of the master cylinder which has been actuated because upon initial movement of the piston thereof, the inlet opening 84 is closed. Furthermore, normally pressure cannot back up through the line 108, line 109, past valve 112, which is normally open, and into the reservoirs 83 of the master cylinders, because the valve 103 is normally closed.

It will be apparent that by properly controlling the lever 65, the continuously rotating input shaft 11 will drive the output shaft 14 in either direction. This can be accomplished regardless of the direction of rotation of the shaft 11. It will be apparent that the transmission 8 (Figure 2) will serve to operate the drive means 10a and, consequently, the sprockets 13 in either direction so as to produce forward or reverse movement of the machine. However, regardless of the direction of rotation of shaft 11, the clutches 39 and 40 may be selectively operated along with the clutch 16 to produce rotation of the output shaft 14 in the desired direction. This will produce the desired swinging movement of the boom. As soon as the control lever is moved into neutral position, the brake clutches 39 and 40 will serve to hold the boom in such position. Although this friction lock accomplishes the same useful purpose as a positive lock for the boom it can yield slightly when excessive forces are applied to the boom, tending to swing it. The automatic control will function to prevent swinging of the boom beyond the desired angle in case the operator neglects to reset the control lever. The control system is such that overlapping of engagement and disengagement of the various clutches will be precluded and the clutches will operate in the proper sequence. However, the time interval between operation of the clutches will be reduced to a minimum and is adjustable. Slipping of the clutches is reduced to a minimum and the stopping and starting work is uniformly divided among the clutches. Because internal expanding clutches are preferably used without the usual external bands, the amount of heat produced can be lessened and such heat that is produced can be dissipated by the exterior cooling fins. All of the clutches may be of the same size and the various parts thereof may be interchanged. Although the above-indicated type of clutches is preferred, my invention is not limited thereto. Also, the automatic stopping mechanism may be set for any desired angle of swing. In some installations, it may even be eliminated altogether.

Many advantages of my clutch system have been referred to above. Others will be apparent from the drawings and the following claims.

Having thus described my invention, what I claim is:

1. A clutch system of the type described for selectively connecting and disconnecting an input shaft and an output shaft in order to drive the output shaft in either a forward or a reverse direction comprising a reversing and brake shaft interposed between the input and output shafts, a drive between the input shaft and reversing and brake shaft and including a master driving clutch associated with the input shaft, a drive between the reversing and brake shaft and the output shaft and including a pair of reversing and brake clutches associated with the reversing and brake shaft, all of said clutches being of the internal expanding friction type including a shoe adapted to be expanded and contracted relative to a drum, means for expanding and contracting the shoe of each of the clutches, said means comprising a pair of levers pivoted intermediate their ends, a hydraulic cylinder connected between one pair of arms of said levers and a spring unit connected between the other pair of arms of said levers, said lever arms being of unequal lengths, the spring unit of said master driving clutch being connected to the long lever arms thereof and the hydraulic cylinder thereof being connected to the short lever arms thereof so that the shoe thereof is normally contracted and the clutch is disengaged, the spring unit of each of said reversing and brake clutches being connected to the short lever arms thereof and the hydraulic cylinder thereof being connected to the long lever arms thereof so that the shoe thereof is normally expanded and the clutch is engaged, and hydraulic control means for selectively forcing fluid into either of the cylinders of the reversing and brake clutches and into the cylinder of said master clutch so as to first disengage one of said reversing and brake clutches and then engage said master clutch, said spring units of the clutches serving when the hydraulic control means is de-energized to relieve pressure on said cylinders to first disengage said master clutch and then engage said brake clutch.

2. A system according to claim 1 wherein the spring units of all of said clutches are adjustable.

3. A system according to claim 1 wherein adjustable stops are associated with the levers of said clutches to limit movement thereof.

4. A system according to claim 1 wherein said control means includes a pair of master cylinders connected by fluid lines to all of said clutch cylinders, and an automatic valve for blocking the connecting line between each of said master cylinders and one of said reversing and brake clutch cylinders each time such master cylinder is actuated.

5. A system according to claim 1 wherein said control means includes a pair of master cylinders connected by fluid lines to all of said clutch cylinders, an automatic valve connected by said lines to the master cylinders and the clutch cylinders for blocking the connecting line between each of said master cylinders and one of said reversing and brake clutch cylinders each time such master cylinder is actuated, a knock-out valve connected to the fluid line between the automatic valve and the cylinder of the master clutch for automatically releasing the pressure on the clutch cylinder of said master clutch and the cylinder of the disengaged reversing and brake clutch to permit disengagement of the master clutch and engagement of the brake clutch without actuating said master cylinder, and trigger mechanism associated with the output shaft for opening said knock-out valve upon rotation of the output shaft to a selected extent in either direction.

6. A system according to claim 1 wherein said control means includes a pair of master cylinders connected by fluid lines to all of said clutch cylinders, an automatic valve for blocking the connecting line between each of said master cylinders and one of said reversing and brake clutch cylinders each time such master cylinder is actuated, a control lever connected to both of said master cylinders and adapted to be swung in opposite directions to selectively actuate such cylinders, and means for yieldingly holding said control lever in either of said positions.

7. A system according to claim 1 wherein said control means includes a pair of master cylinders connected by fluid lines to all of said clutch cylinders, an automatic valve connected by said lines to the master cylinders and the clutch cylinders for blocking the connecting line between each of said master cylinders and one of said reversing and brake clutch cylinders each time such master cylinder is actuated, a control lever connected to both of said master cylinders and adapted to be swung in opposite directions to selectively actuate such cylinders, a knock-out valve connected to the fluid line between the automatic valve and the cylinder of the master clutch for automatically releasing the pressure on the cylinder of said master clutch and the cylinder of the disengaged reversing and brake clutch to permit disengagement of the master clutch and engagement of the brake clutch without moving said control lever to actuate said master cylinder, trigger mechanism associated with the output shaft for opening said knock-out valve upon rotation of the output shaft to a selected extent in either direction, each of said master cylinders including a reservoir to which said knock-out valve is connected by a fluid return line, a valve in said fluid return line and being normally held open, and means associated with said control lever for closing said last-named valve to restore pressure in the fluid lines and connected cylinders after said knock-out valve has been operated.

8. A system according to claim 1 wherein a driving connection is provided between said input shaft and said reversing and brake shaft controlled by said master clutch, said output shaft being disposed at right angles to said reversing and brake shaft and adjacent thereto and carrying a driving gear, a pair of gears disposed on said reversing and brake shaft and meshing with said driving gear at diametrically opposed points, said gears on said reversing and brake shaft being selectively connected thereto and disconnected therefrom by engagement and disengagement of said brake clutches.

9. In a system for controlling the swinging movement of a boom or the like, a gear segment to which the boom is connected, a boom swing shaft having a gear meshing with said segment, means for selectively driving said shaft in either direction or applying a braking force thereto, said means including a reversible power shaft, clutches for connecting said power shaft to said boom swing shaft, said clutches including a master clutch associated with the power shaft and a pair of reversing and brake clutches, a third shaft carrying said reversing and brake clutches disposed adjacent said boom swing shaft, a drive between said power shaft and said third shaft controlled by said master clutch, said third shaft carrying a pair of axially spaced gears each of which is associated with one of said reversing and brake clutches and is adapted to be connected to the shaft when such clutch is engaged, a gear carried by said boom swing shaft and with which said pair of gears mesh at opposite sides thereof, each of said reversing and brake clutches including a spring unit for engaging it and a hydraulic cylinder for disengaging it, said master clutch including a spring unit for disengaging it and a hydraulic cylinder for engaging it, a hydraulic control system connected to the hydraulic cylinders of all of said clutches, the spring units and hydraulic cylinders of the various clutches being so arranged that upon actuation of said hydraulic control system to swing the boom one of the reversing and brake clutches will first be disengaged and then the master clutch will be engaged and upon actuation of said hydraulic control system to stop swinging of the boom said master clutch will first be disengaged and then said brake clutch will again be engaged.

10. A system according to claim 9 wherein said hydraulic control system comprises a pair of master cylinders which are connected by fluid lines with all of said clutch cylinders, a control lever for selectively actuating either of said master cylinders; and an automatically actuated valve for blocking the connecting line between each of said master cylinders and one of said reversing and brake clutch cylinders each time such master cylinder is actuated.

11. A system according to claim 9 wherein said hydraulic control system comprises a pair of master cylinders which are connected by fluid lines with all of said clutch cylinders, a control lever for selectively actuating either of said master cylinders, an automatically actuated valve for blocking the connecting line between each of said master cylinders and one of said reversing and brake clutch cylinders each time such master cylinder is actuated, a knock-out valve connected in said hydraulic control system for automatically releasing the pressure on the clutch cylinders of said master clutch and said reversing and brake clutch to permit disengagement of the master clutch and engagement of the brake clutch without actuating said master cylinder, and trigger mechanism associated with said boom swing segment for opening said knock-out valve upon rotation of said segment to a selected degree in either direction.

12. A system according to claim 9 wherein said hydraulic control system comprises a pair of master cylinders which are connected by fluid lines with all of said clutch cylinders, a control lever for selectively actuating either of said master cylinders, an automatically actuated valve for blocking the connecting line between each of said master cylinders and one of said brake clutch cylinders each time such master cylinder is actuated, a knock-out valve connected in said hydraulic control system for automatically releasing the pressure on the clutch cylinders of said master clutch and said reversing and brake clutch to permit disengagement of the master clutch and engagement of the brake clutch without actuating said master cylinder, trigger mechanism associated with said boom swing segment for opening said knock-out valve upon rotation of said segment to a selected degree in either direction, each of said master cylinders including a reservoir to which said knock-out valve is connected by a fluid return line, a valve in said fluid return line and being normally held open, and means associated with said control lever for closing said last-named valve to restore pressure in the hydraulic system after said knock-out valve has been opened.

13. A clutch system of the type described for selectively connecting and disconnecting an input shaft and an output shaft comprising a reversing and brake shaft interposed between the input and output shafts, a drive between the input shaft and reversing and brake shaft and including a master driving clutch associated with the input shaft, a drive between the reversing and brake shaft and the output shaft and including a pair of reversing and brake clutches associated with the reversing and brake shaft, said master driving clutch including means for normally keeping it disengaged and said reversing and brake clutches including means for normally keeping them engaged, and control means for first releasing either of said reversing and brake clutches and then engaging said master clutch, said control means including a hydraulic system embodying a hydraulic actuating cylinder for each of said clutches and a pair of master hydraulic cylinders, each of said master cylinders being connected to all of said clutch cylinders, and means for blocking the connection between each of said master cylinders and one of said reversing and brake clutch cylinders each time such master cylinder is actuated.

14. A clutch system of the type described for selectively connecting and disconnecting an input shaft and an output shaft comprising a reversing and brake shaft interposed between the input and output shafts, a drive between the input shaft and reversing and brake shaft and including a master driving clutch associated with the input shaft, a drive between the reversing and brake shaft and the output shaft and including a pair of reversing and brake clutches associated with the reversing and brake shaft, said master driving clutch including means for normally keeping it disengaged and said reversing and brake clutches including means for normally keeping them engaged, control means for first releasing either of said reversing and brake clutches and then engaging said master clutch, and additional control means for automatically disengaging said master clutch and permitting engagement of both of said reversing clutches upon rotation of said output shaft to the desired extent in either direction.

15. In a system for controlling the swinging movement of a boom or the like, a gear segment to which the boom is connected, a boom swing shaft having a gear meshing with said segment, means for selectively driving said shaft in either a forward or a reverse direction or applying a braking force thereto, said means including a power shaft and a third shaft, clutches for connecting said power shaft to said boom swing shaft, said clutches including a master clutch associated with the power shaft and a pair of reversing and brake clutches associated with the third shaft, said master clutch including means for normally keeping it disengaged and said reversing and brake clutches including means for normally keeping them engaged, control means for first releasing either of said reversing and brake clutches and then engaging said master clutch, and additional control means for disengaging said master clutch and permitting engagement of both of said reversing and brake clutches upon swinging of the boom swinging segment to a predetermined angle in either direction.

16. A clutch system of the type described for selectively connecting and disconnecting an input shaft and an output shaft comprising a reversing and brake shaft interposed betwen the input and output shafts, a drive between the input shaft and reversing and brake shaft and including a master driving clutch associated with the input shaft, a drive betwen the reversing and brake shaft and the output shaft and including a pair of reversing and brake clutches associated with the reversing and brake shaft, each of the clutches including actuating mechanism, the actuating mechanism of the master clutch keeping it normally disengaged and the actuating mechanism of each of the reversing and brake clutches keeping it normally engaged, a fluid pressure unit for actuating each of said clutch-actuating mechanisms, a fluid control circuit connected to each of said units and including means for subjecting the unit of a selected reversing and brake clutch and the unit of the master clutch simultaneously to fluid pressure, said actuating mechanism of the master clutch requiring greater fluid pressure to actuate it to disengage such clutch than is required to actuate the actuating mechanism of the brake clutch to engage it in order to insure that when the fluid pressure is applied by the circuit the master clutch will be engaged before the brake clutch is disengaged and to insure that when the fluid pressure is released the master clutch will first be disengaged and then the brake clutch will be engaged.

17. A clutch system of the type described for selectively connecting and disconnecting an input shaft and an output shaft comprising a reversing and brake shaft interposed between the input and output shafts, a drive between the input shaft and reversing and brake shaft and including a master driving clutch associated with the input shaft, a drive between the reversing and brake shaft and the output shaft and including a pair of reversing and brake clutches associated with the reversing and brake shaft, each of the clutches including lever mechanism and each of which has a spring and fluid pressure unit which serve to operate the mechanism in opposite directions, the spring of the master clutch lever mechanism serving to keep such clutch normally disengaged and the spring of each of the reversing and brake clutch mechanisms serving to keep such clutch normally engaged, a fluid control circuit connected to each of said fluid pressure units and including means for subjecting the unit of a selected reversing and brake clutch and the unit of the master clutch simultaneously to fluid pressure, said lever mechanism of the master clutch requiring greater fluid pressure on the unit thereof to overcome the spring associated therewith to disengage such clutch than is required on the fluid pressure unit of the brake clutch to overcome the spring associated with the lever mechanism thereof to engage such clutch in order to insure that when the fluid pressure is applied by the circuit, the master clutch will be engaged before the brake clutch is disengaged and to insure that when the fluid pressure is released, the master clutch will first be disengaged and then the brake clutch will be engaged.

WILLIAM G. VAN VOORHIS.

REFERENCES CITED

The following references are of record in the file of this patent:

UNITED STATES PATENTS

| Number | Name | Date |
| --- | --- | --- |
| 1,877,297 | Goldberg | Sept. 13, 1932 |
| 1,883,743 | Maybach | Oct. 18, 1932 |
| 1,960,815 | Jessen et al. | May 29, 1934 |
| 2,077,292 | Waseige | Apr. 13, 1937 |
| 2,104,061 | Lundy | Jan. 4, 1938 |
| 2,146,030 | Schjolin | Feb. 7, 1939 |
| 2,179,267 | Miller | Nov. 7, 1939 |
| 2,197,063 | Ashton | Apr. 16, 1940 |
| 2,266,651 | McLean | Dec. 16, 1941 |
| 2,342,880 | Masek | Feb. 29, 1944 |
| 2,352,969 | Parsons | July 4, 1944 |

FOREIGN PATENTS

| Number | Country | Date |
| --- | --- | --- |
| 7,539 | Great Britain | A. D. Apr. 16, 1894 |